(12) United States Patent
Li et al.

(10) Patent No.: US 8,830,618 B2
(45) Date of Patent: Sep. 9, 2014

(54) FLY HEIGHT CONTROL FOR HARD DISK DRIVES

(71) Applicant: LSI Corporation, Milpitas, CA (US)

(72) Inventors: Yan Li, Shangai (CN); Xuemin Yang, Edina, MN (US); Scott M. O'Brien, Eden Prairie, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/731,693

(22) Filed: Dec. 31, 2012

(65) Prior Publication Data

US 2014/0185158 A1 Jul. 3, 2014

(51) Int. Cl.
*G11B 21/02* (2006.01)
*G11B 20/10* (2006.01)
*G11B 5/60* (2006.01)

(52) U.S. Cl.
CPC .................. *G11B 5/6011* (2013.01)
USPC .............................. 360/75; 360/39

(58) Field of Classification Search
None
See application file for complete search history.

(56) References Cited

U.S. PATENT DOCUMENTS

| | | |
|---|---|---|
| 4,260,946 A | 4/1981 | Wheatley, Jr. |
| 4,298,835 A | 11/1981 | Rowe |
| 4,477,737 A | 10/1984 | Ulmer et al. |
| 5,864,225 A | 1/1999 | Bryson |
| 5,991,113 A | 11/1999 | Meyer et al. |
| 6,184,743 B1 | 2/2001 | Swart |
| 6,255,807 B1 | 7/2001 | Doorenbos et al. |
| 6,288,525 B1 | 9/2001 | Fischer |
| 6,791,396 B2 | 9/2004 | Shor et al. |
| 6,828,847 B1 | 12/2004 | Marinca |
| 7,023,647 B2 | 4/2006 | Bloodworth et al. |
| 7,046,473 B2 | 5/2006 | Fu et al. |
| 7,061,706 B2 | 6/2006 | Conteras et al. |
| 7,097,110 B2 | 8/2006 | Sheperek et al. |
| 7,180,692 B1 | 2/2007 | Che et al. |
| 7,253,598 B1 | 8/2007 | Doyle et al. |

(Continued)

OTHER PUBLICATIONS

K.N. Leung et al., "A 2-V 23-μA 5.3-ppm/° C. Curvature-Compensated CMOS Bandgap Voltage Reference," IEEE Journal of Solid-State Circuits, Mar. 2003, pp. 561-564, vol. 38, No. 3.

(Continued)

*Primary Examiner* — K. Wong
(74) *Attorney, Agent, or Firm* — Ryan, Mason & Lewis, LLP

(57) ABSTRACT

A fly height control circuit includes an input node to receive a digital control signal, an output node to output a control current to a resistive heater element to adjust a spacing between a read/write head and a surface of a storage medium, and control circuitry to process the digital control signal and generate the output control current based on the digital control signal. The control circuitry generates a first reference current based at least in part on the control current output from the output node. The control circuitry controls a slew rate of the first reference current to generate a slew rate controlled reference current. The control circuitry generates a second reference current based on a feedback voltage at the output node. The control circuitry compares the slew rate controlled reference current with the second reference current to adjust the control current output from the output node.

20 Claims, 5 Drawing Sheets

(56) References Cited

U.S. PATENT DOCUMENTS

| | | |
|---|---|---|
| 7,301,715 B2 | 11/2007 | Huang et al. |
| 7,375,912 B2 | 5/2008 | Brannon et al. |
| 7,477,470 B2 | 1/2009 | Leis et al. |
| 7,583,462 B2 | 9/2009 | Ohta et al. |
| 7,777,466 B2 | 8/2010 | Crippa et al. |
| 7,864,474 B2 * | 1/2011 | Satoh et al. ............ 360/59 |
| 7,872,825 B2 | 1/2011 | Sanghvi |
| 7,969,681 B2 * | 6/2011 | Satoh et al. ............ 360/75 |
| 2005/0184797 A1 | 8/2005 | Choi |
| 2005/0285666 A1 | 12/2005 | Garlapati et al. |
| 2006/0001412 A1 | 1/2006 | Fernald |
| 2007/0069711 A1 | 3/2007 | Dadashev et al. |
| 2007/0170906 A1 | 7/2007 | Marinca |
| 2007/0268615 A1 | 11/2007 | McFadyen et al. |
| 2010/0301832 A1 | 12/2010 | Katyal et al. |

OTHER PUBLICATIONS

S. Somvanshi et al., "A Low Power Sub-1 V CMOS Voltage Reference," IEEE International System on Chip (SOC) Conference, Sep. 2008, pp. 271-276.

I.M. Filanovsky et al., "BiCMOS Cascaded Bandgap Voltage Reference," IEEE 39th Midwest Symposium on Circuits and Systems, Aug. 1996, pp. 943-946, vol. 2.

M. Ueda et al., "A 3.3V ASIC for Mixed Voltage Applications With Shut Down Mode," IEEE Custom Integrated Circuits Conference, May 1993, pp. 25.5.1-25.5.4.

B. Cline et al., "The AimLow LDO: A 130nm 1.5V High-Performance Linear Voltage Regulator," pp. 1-5.

G.W. Den Besten et al., "Embedded 5 V-to-3.3 V Voltage Regulator for Supplying Digital IC's in 3.3 V CMOS Technology," IEEE Journal of Solid-State Circuits, Jul. 1998, pp. 956-962, vol. 33, No. 7.

* cited by examiner

400

500

600

700

US 8,830,618 B2

FLY HEIGHT CONTROL FOR HARD DISK DRIVES

FIELD OF THE INVENTION

The field generally relates to fly height control mechanisms for hard disk drives and, more specifically, fly height control circuits that are implemented in preamplifiers of hard disk storage devices to control a clearance between read/write heads and a surface of a hard disk storage medium.

BACKGROUND

Disk-based storage devices such as hard disk drives are used to provide non-volatile data storage in a wide variety of different types of data processing systems. A typical hard disk drive comprises a spindle that holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed. In order to control and adjust the clearance between the read/write head and the surface of the storage disk, fly height control circuitry is implemented in or otherwise supported by preamplifier circuitry of the hard disk drive device.

In a conventional fly height control framework, a resistive heating element on a slider element is incorporated near an electromagnetic pole tip of the read/write head, and fly height control circuitry is employed to apply power to the heater element sitting on the slider to adjust the fly height of the read/write head such that the spacing between the read/write head and the surface of the storage disk can be electronically controlled via thermal expansion of the electromagnet poles. As the operating temperature of the hard disk drive changes, it is desirable to keep the fly height, or spacing between the read/write head and the storage disk surface as constant as possible to achieve accurate writing and reading of data to and from the storage disk. As the clearance between read/write heads and the media surface continues to decrease, high precision fly height control circuits are required for accurate and precision fly height control, whereby electromagnetic coupling between fly height control heater element and read/write heads should be eliminated to guarantee optimal read/write performance.

SUMMARY

In one embodiment of the invention, a fly height control circuit includes an input node to receive a digital control signal, an output node to output a control current to a resistive heater element to adjust a spacing between a read/write head and a surface of a storage medium, and control circuitry to process the digital control signal and generate the output control current based on the digital control signal. The control circuitry generates a first reference current based at least in part on the control current output from the output node. The control circuitry controls a slew rate of the first reference current to generate a slew rate controlled reference current. The control circuitry generates a second reference current based on a feedback voltage at the output node. The control circuitry compares the slew rate controlled reference current with the second reference current to adjust the control current output from the output node.

Other embodiments of the invention will become apparent.

WRITTEN DESCRIPTION

Figure 1:
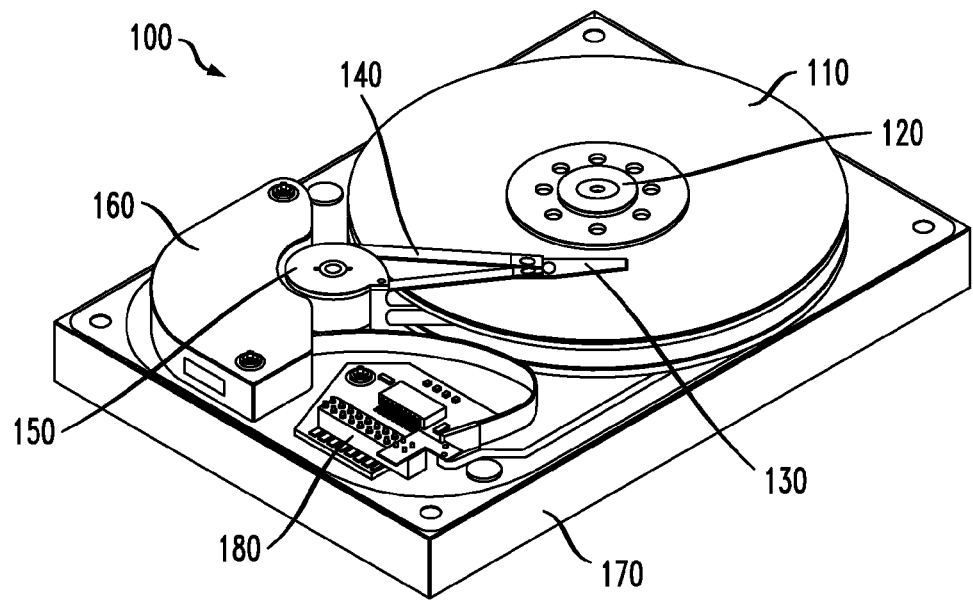
FIG. 1 shows a perspective view of a disk-based storage device according to an embodiment of the invention.

FIG. 1 shows a storage device 100 according to an embodiment of the invention. The storage device 100 comprises a hard disk drive that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor (not explicitly shown in FIG. 1) to spin the storage disk 110 at high speed. Data is read from and written to the storage disk 110 via a read/write head 130 that is mounted on a positioning arm 140. An actuator motor 150 (or voice coil motor) is connected to one end of the positioning arm 140 opposite the read/write head 130. The actuator motor 150 comprises a permanent magnet and a moving coil motor, which operate to controllably swing the read/write head 130 into a desired position across the magnetic surface of the storage disk 110 as the storage disk 110 spins by operation of the spindle motor. The storage device 100 further comprises an upper housing 160 which houses driver circuitry and other mechanical and electronic components for controlling the actuator motor 150 and the spindle motor. The upper housing 160 further comprises control circuitry such as preamplifier electronics that are mounted proximate to the pivot location of the actuator motor 150. Thin printed-circuit cables are used to connect the read/write heads 130 to the preamplifier electronics mounted in the housing 160.

The storage device 100 further comprises other control circuitry mounted on or more printed circuit boards that are disposed in a lower housing 170 of the storage device 100. The control circuitry comprises various drive electronics, signal processing electronics, and associated processing and memory circuitry, to control the writing and reading of data to and from the storage disk, as well as additional or alternative elements that are utilized to drive and control the spindle and actuator motors. A connector 180 is used to connect the storage device 100 to a host computer or other related processing device.

FIG. 1 shows an embodiment of the invention with one instance of each of the single storage disk 110, read/write head 130, and positioning arm 140. In an alternate embodiment of the invention, the storage device 100 comprises multiple instances of one or more of these or other drive components. For example, in an alternative embodiment of the invention, the storage device 100 comprises multiple storage disks attached to the same spindle such that each storage disk rotates at the same speed, as well as multiple read/write heads and associated positioning arms coupled to one or more actuators.

A read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 100 as illustrated in FIG. 1 may include other elements in addition to, or in place of those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
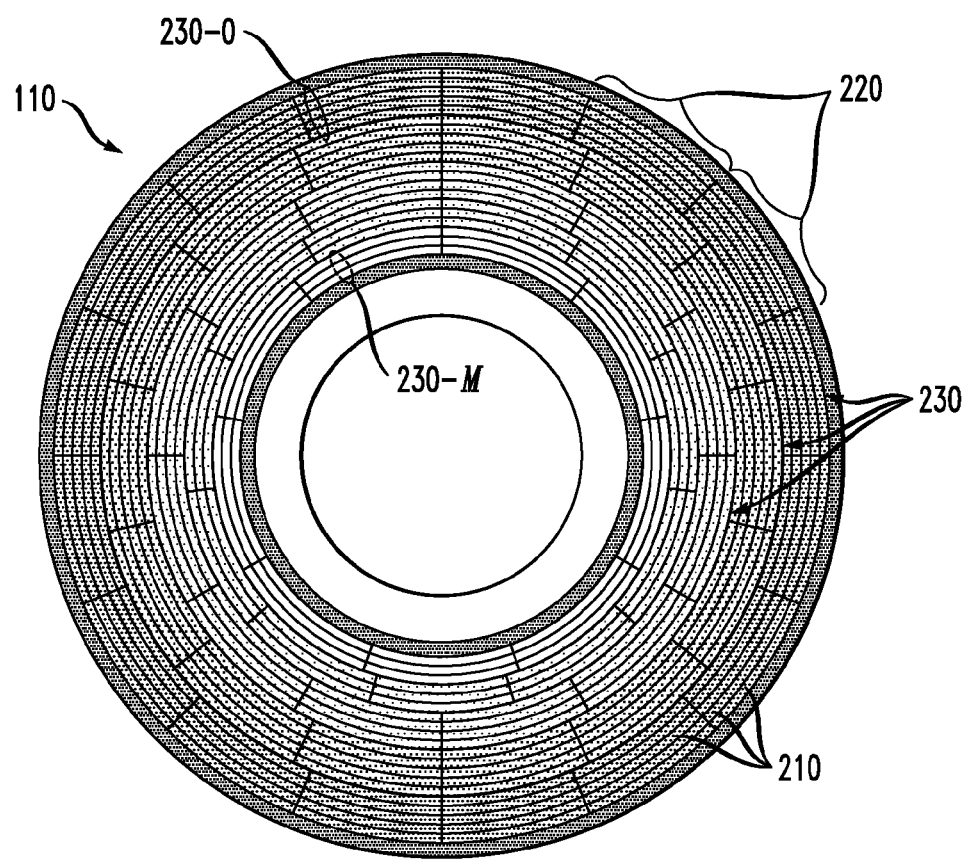
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 that are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head 130 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment of the invention by more than a factor of two. For example, in one embodiment of the invention, the outermost annular zone may have a data transfer rate of approximately 2.3 Gigabits per second (Gb/s), while the innermost annular zone has a data transfer rate of approximately 1.0 Gb/s. In such an implementation, the hard disk drive may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks. The particular data transfer rates and other features described above are presented for purposes of illustration only, and should not be construed as limiting in any way. A wide variety of other data transfer rates and storage disk configurations may be used in other embodiments.

Figure 3:
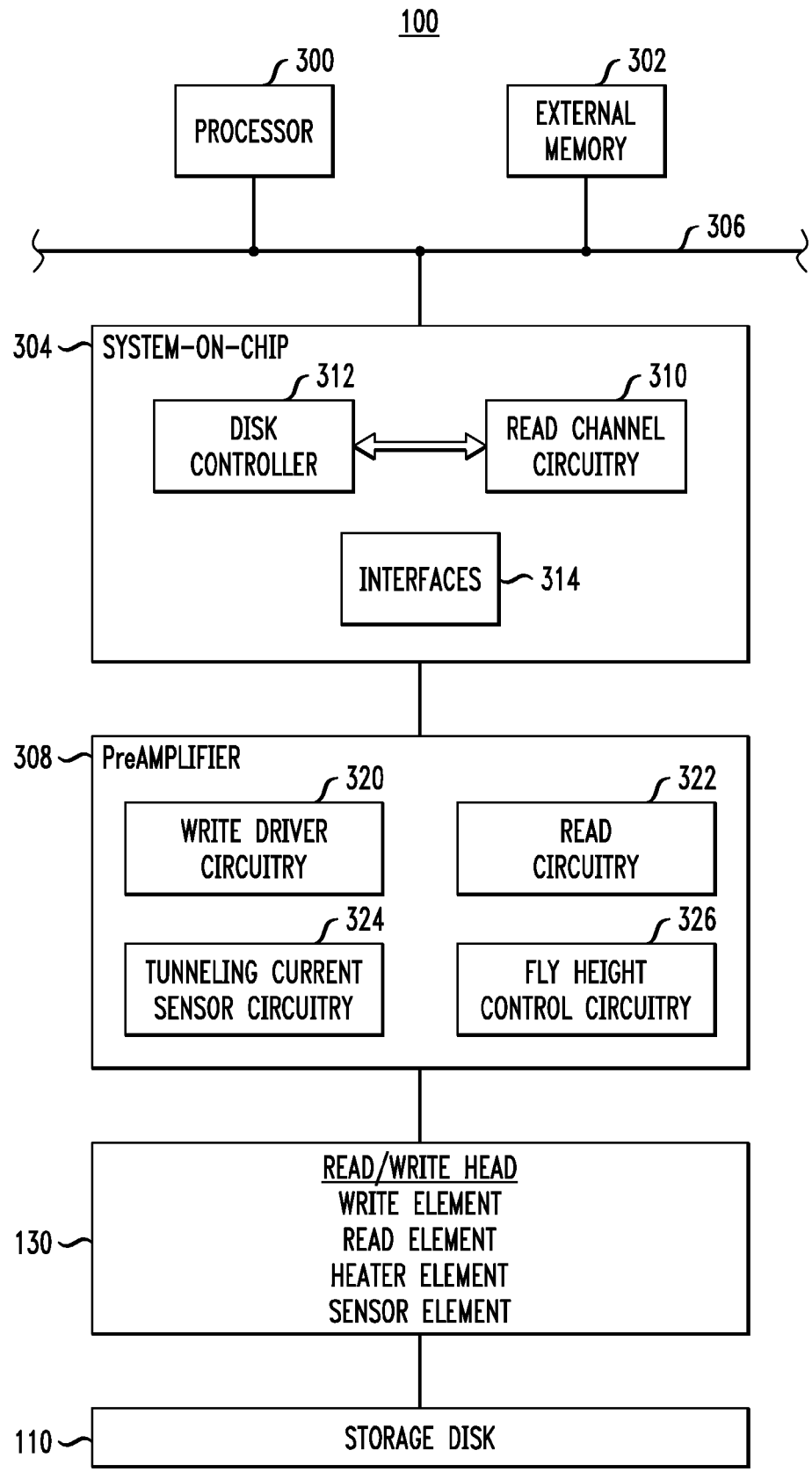
FIG. 3 schematically illustrates a storage device according to another embodiment of the invention.

FIG. 3 shows a portion of the storage device 100 of FIG. 1 in greater detail. As shown in FIG. 3, the storage device 100 comprises a processor 300, a memory 302, and a system-on-a-chip (SOC) 304, which communicate over a bus 306. The storage device 100 further comprises a preamplifier 308 providing an interface between the SOC 304 and the read/write head 130. The memory 302 is an external memory relative to the SOC 304 and other components of the storage device 100, but is nonetheless internal to the storage device 100. The SOC 304 includes read channel circuitry 310, a disk controller 312, and interfaces 314, wherein the SOC 304 directs the operation of the read/write head 130 in reading data from and writing data to the storage disk 110. The interfaces 314 communicate with the circuitry 320, 322, 324, and 326 in the preamplifier 308. The interfaces 314 may be viewed as examples of what are more generally referred to herein as "interface circuitry." The interfaces 314 may include, for example, one or more write interfaces over which write signals are provided to the preamplifier 308 from the SOC 304, and one or more read interfaces over which read signals are provided to the SOC 304 from the preamplifier 308. It is to be appreciated, however, that the disclosed techniques are not limited to such write and read interfaces, and may be adapted for use with a wide variety of other types of interfaces.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments of the invention, and such arrangements may include a subset of the components 300, 302, 304 and 308, or portions of one or more of these components. For example, the SOC 304 itself may be viewed as an example of "control circuitry." The control circuitry of the storage device 100 as shown in FIG. 3 is generally configured to process data received from and supplied to the read/write head 130 and to control positioning of the read/write head 130 relative to the storage disk 110. Certain operations of the SOC 304 in the storage device 100 of FIG. 3 may be directed by processor 300, which executes code stored in external memory 302. Thus, at least a portion of the control functionality of the storage device 100 may be implemented at least in part in the form of software code.

The external memory 302 may comprise electronic memory such as random access memory (RAM) or read-only memory (ROM), in any combination. In one embodiment of the invention, the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in one embodiment is assumed to be implemented on a single integrated circuit, that integrated circuit may further comprise portions of the processor 300, memory 302, bus 306, and preamplifier 308. Alternatively, portions of the processor 300, memory 302, bus 306, and preamplifier 308 may be implemented at least in part in the form of one or more additional integrated circuits, such as otherwise conventional integrated circuits designed for use in a hard disk drive and suitably modified to implement tunneling current sensor circuitry as described herein. Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

Although shown as part of the storage device 100, in an alternate embodiment of the invention, one or both of the processor 300 and memory 302 are implemented at least in part within an associated processing device, such as a host computer or server in which the storage device is installed. Accordingly, elements 300 and 302 in FIG. 3 may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

As further depicted in FIG. 3, the preamplifier 308 comprises write driver circuitry 320, read circuitry 322, tunneling current sensor circuitry 324, and fly height control circuitry 326. The read/write head 130 comprises various components such as a write element, read element, heater element and sensor element. The write driver circuitry 320 provides write signals to the read/write head 130 to write data to the storage disk 110 using the write element(s) of the head 130. The write signals are generally characterized as current signals, but may alternatively be characterized as voltage signals. Data bits are usually each stored as group of media grains oriented in a common magnetization direction (e.g., up or down). In order to record a given data bit, the write driver circuitry 320 generates a write signal that transitions from a negative write current to a positive write current, or vice-versa, where the magnitude of the write current from zero to its peak value may be in the range of about 15 to 65 milliamperes (mA), although different values can be used. The term "write driver circuitry" is intended to encompass any type of driver circuitry that may be used to generate one or more write signals.

The read element of the read/write head 130 is used to read data from the storage disk 110 in conjunction with the read circuitry 322 of the preamplifier 308. The read circuitry 322 transforms signal waveforms read back from the storage disk 110 into data for delivery to the computer.

The fly height control circuitry 326 comprises a power amplifier and other support circuitry (as further discussed below with reference to FIGS. 4 and 5, for example) that is programmed to generate and regulate either a programmed voltage or power to the heater element (e.g., resistive heater element) in the read/write head 130, which causes the tip of the head 130 (that contains the read/write elements) to move closer to the surface of the storage disk 110 via a heater actuation process. As the read/write head 130 approaches the surface of the storage disk 110, a sensor current is generated in the sensor element (e.g., metallic needle). The sensor current increases as the sensor element approaches the surface of the storage disk 110.

The sensor current is input to, and processed by, the tunneling current sensor circuitry 324 to detect when the read/write head 130 is positioned at some predefined distance (gap) from the surface of the storage disk 110, which is deemed sufficient to properly perform a read or write operation, based on a magnitude of the sensor current. The heater actuation process nudges the read/write head 130 closer to the surface of the storage disk 110 until the magnitude of the sensor current reaches a predefined (programmed) reference level. When the sensor current is determined to have reached the predefined reference level, the tunneling current sensor circuitry 324 generates a control signal indicating a "detection event." The term "detection event" as used herein refers to an occurrence of when the read/write head 130 is determined to be positioned at a predefined (gap) distance from the surface of the storage disk to perform a read or write operation. The "detection event" control signal causes the fly height control circuitry 326 to control the heater actuation process so that the read/write head 130 stops moving toward the surface of the storage disk.

In general, the amount of sensor current generated by the sensor element is a sum of multiple currents generated by different current sources. For instance, the sensor current includes a "tunneling current" that is generated by the sensor element as a function of a bias voltage (applied to the sensor element) and a gap distance between the sensor element (e.g., needle) and the surface of the storage disk 110. The tunneling current increases exponentially as the read/write head 130 approaches the disk. Other sources of the sensor current include static electricity, for example. Typically, disk drive manufacturers will select a predefined gap distance as the smallest gap between head tip and the storage media without touching. For a given design, the magnitude of the sensor current that is generated (from all sources) at that target gap distance is deemed to be the reference sensor current level that would be indicative of a detection event. The gap distance (or fly height) is controllably adjusted by the fly height control circuitry 326.

In one embodiment of the invention, the fly height control circuitry 326 comprises a control framework to control the flying height of read/write heads based on constant power dissipation with output voltage slew rate control and output power slope trim control functions. In particular, in one embodiment of the invention, the fly height control circuitry 326 implements a power control function to provide a constant output power to a resistive heater element to accurately adjust the gap distance between read/write heads and the surface of the storage disk independent of the resistance of a heater element and operating conditions. Moreover, in one embodiment of the invention, the fly height control circuitry 326 implements a slew rate control function that provides a constant output voltage ramping up/down speed (well-controlled slew rate) independent of the resistance of the restive heater element and changes in the output voltage/power. The slew rate control functionality provides a well-controlled slew rate that eliminates or otherwise substantially reduces electromagnetic voltage coupling from the resistive heater element to the read/write heads. Furthermore, in one embodiment of the invention, the fly height control circuitry 326 implements a trim control function to adjust the output power slope in a linear manner (the slope of output power can be linearly trimmed) in a percentage wised manner without affecting output linearity/monotonicity. Various embodiments of the fly height control circuitry 326 of FIG. 3 will now be discussed in further detail with reference to FIGS. 4 and 5, for example.

Figure 4:
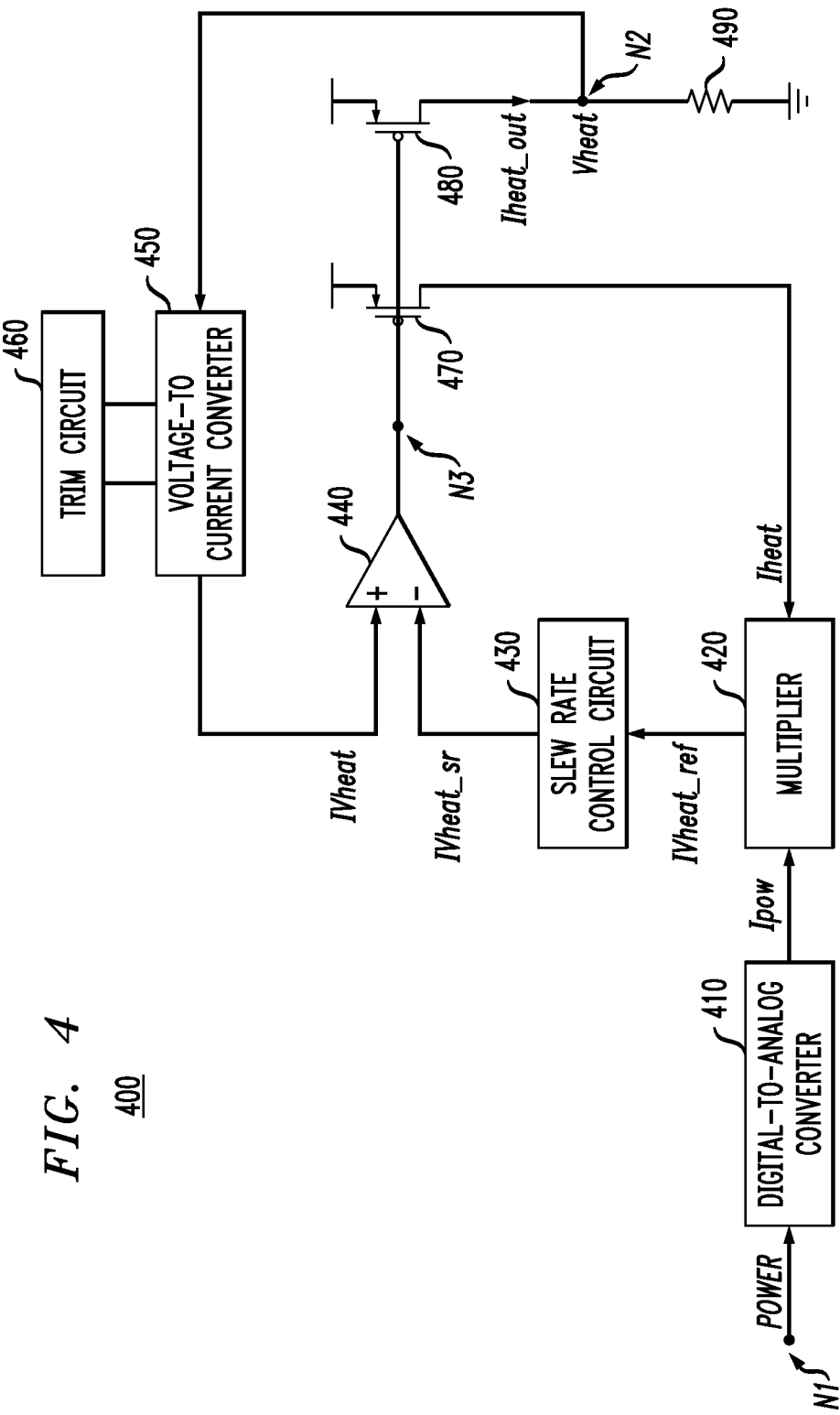
FIG. 4 is a block diagram of a fly height control system according to an embodiment of the invention.

FIG. 4 is a block diagram of a fly height control system according to an embodiment of the invention. In particular, FIG. 4 illustrates a fly height control system 400 which comprises an input node N1, an output node N2, a digital-to-analog converter circuit 410, a current multiplier circuit 420, a slew rate control circuit 430, an error amplifier 440, a voltage-to-current converter circuit 450, a trim circuit 460, output transistors 470 and 480, and a resistive heater element 490. The fly height control system 400 controls the power that is applied to the resistive heater element 490 based on a control signal, Power, which received at the input node N1. The fly height control system 400 generates a current, Iheat_out, which flows from the output node N2 through the resistive heater element 490 to generate a voltage, Vheat, at the output node N2. The output current, Iheat_out, is adjusted by the fly height control system 400 to control the power applied to the resistive heater element 490 and, thereby, controllably adjust the spacing between the read/write head 130 and a surface of the storage disk 110, as discussed above with reference to FIG. 3.

The digital control signal, Power, is input to the digital-to-analog converter circuit 410. In one embodiment of the invention, the digital-to-analog converter circuit 410 is a current mode digital-to-analog converter which converts the digital signal, Power, into a current, Ipow, which is output to the current multiplier circuit 420. The current Ipow=$k_0$*DAC, where $k_0$ denotes a gain constant and DAC denotes a decimal value of the digital code input to the digital-to-analog converter circuit 410. The current multiplier circuit 420 also receives a reference current, Iheat, which is a current that is proportional to the output current, Iheat_out. In one embodiment of the invention, the output transistors 470 and 480 are PMOS transistors that generate proportional currents, Iheat and Iheat_out, based on a control voltage that is output from the error amplifier 440 on node N3 and commonly applied to the gate terminals of the PMOS transistors 470 and 480. The output transistor 480 generates the output current, Iheat_out, which flows through the resistive heater element 490, and the output transistor 470 generates the current, Iheat, which is fed back to the current multiplier circuit 420. The output transistor 470 is a mirror device of the output transistor 480, so as to generate a current, Iheat, which is proportional to the output current, Iheat_out. In one embodiment of the invention, the output transistors 470 and 480 generate proportional currents, Iheat and Iheat_out, in a ratio of about 1:30.

The current multiplier circuit 420 generates a reference current, IVheat_ref, based on the currents Ipow and Iheat that are input to the current multiplier circuit 420. The current multiplier circuit 420 implements a multiplication function to generate the reference current, IVheat_ref. In one embodiment of the invention, the current multiplier circuit 420 implements a dividing function and is configured to multiply the current Ipow by 1/Iheat, where:

$$\text{IVheat\_ref} = \frac{Ipow}{Iheat}. \qquad \text{Eqn. (1)}$$

Figure 5:
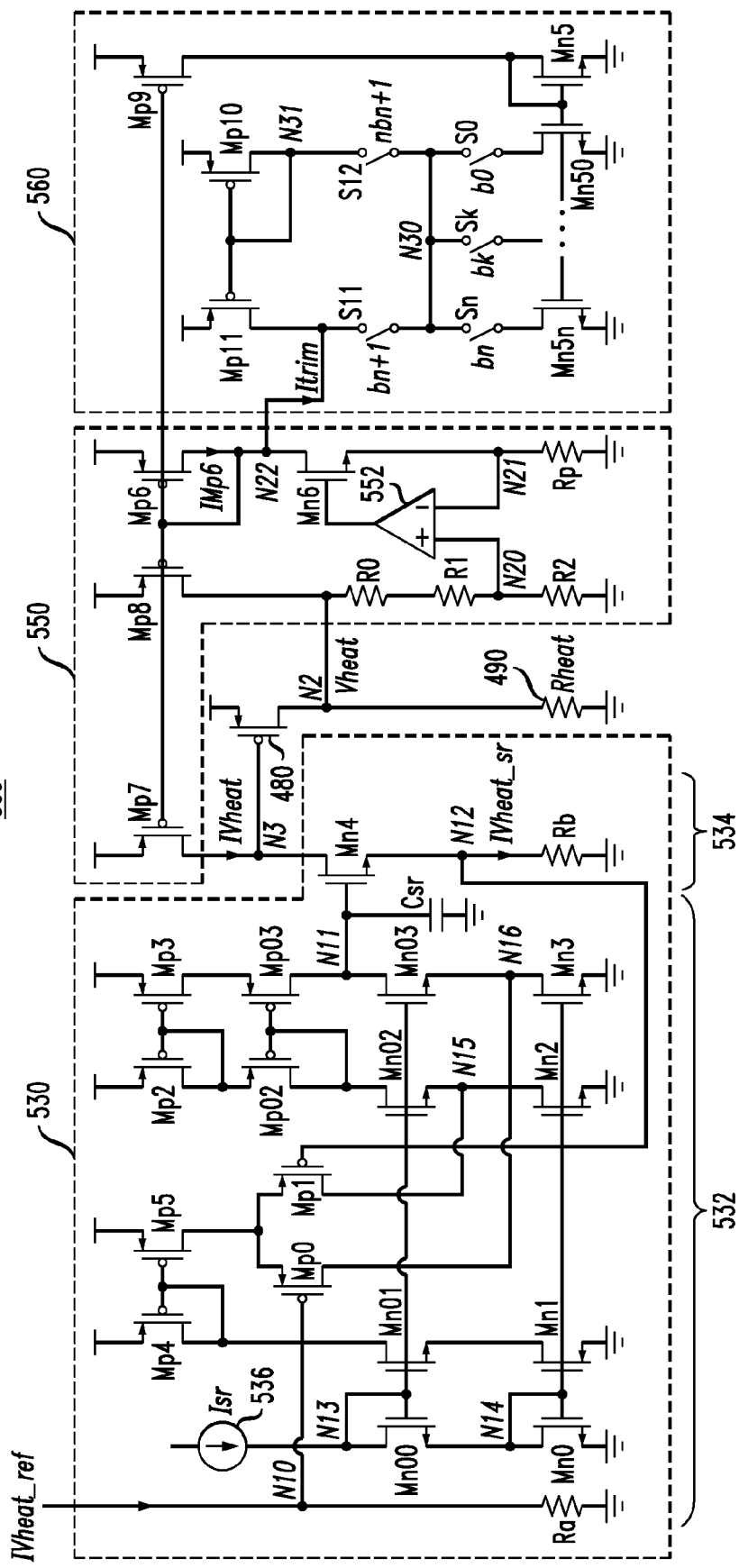
FIG. 5 is a schematic circuit diagram of fly height control circuitry according to an embodiment of the invention.

The reference current, IVheat_ref, is input to the slew rate control circuit 430. The slew rate control circuit 430 outputs a slew rate controlled reference current, IVheat_sr. In one embodiment of the invention, the slew rate control circuit 430 implements a slew rate control function to decrease the rate of change of the input reference current, IVheat_ref, and outputs a slowly ramping reference current, IVheat_sr. Moreover, the slew rate control circuit 430 scales the input reference current IVheat_ref, to generate a slew rate controlled reference current as:

$$\text{IVheat\_sr} = k_2 * \text{IVheat\_ref} = k_2 * \frac{Ipow}{Iheat}, \qquad \text{Eqn. (2)}$$

where $k_2$ denotes a scaling factor applied by the slew rate control circuit 430. In one embodiment of the invention, the slew rate control circuit 430 implements a slew rate control circuit architecture 530 as shown in FIG. 5, which will be discussed in further detail below.

The output voltage Vheat on the output node N2 is fed back to the voltage-to-current converter circuit 450, where the voltage Vheat is converted into a current IVheat. In one embodiment of the invention, the voltage-to-current converter circuit 450 generates an output current as:

$$IVheat = k_1 * Vheat \qquad \text{Eqn. (3),}$$

where $k_1$ is a constant. In one embodiment of the invention, the voltage-to-current converter circuit 450 implements a voltage-to-current converter circuit architecture 550 as shown in FIG. 5, which will be discussed in further detail below.

The error amplifier 440 receives as input the current IVheat (output from the voltage-to-current converter circuit 450) and the slew rate controlled reference current IVheat_sr (output from the slew rate control circuit 430). The error amplifier 440 comprises a current comparator that compares the two input currents IVheat and IVheat_sr and amplifies a difference between the two currents, i.e., amplifies the differential signal IVheat−IVheat_sr. The error amplifier 440 outputs a control signal on node N3 based on the difference of IVheat−IVheat_sr, which is a voltage that drives the gate terminals of the output transistors 470 and 480.

A negative feedback loop is formed when the output of error amplifier 440 drives the gate terminal of the PMOS transistor 480. Due to a high gain of the negative feedback loop, the current, IVheat, will be equal to the slew rate controlled reference current, IVheat_sr, at any given time, i.e.:

$$IVheat(t) = IVheat\_sr(t) \qquad \text{Eqn. (4),}$$

if the loop bandwidth is faster than the bandwidth of the slew rate control circuit 430. As a consequence, the slew rate of the output voltage Vheat on the output node N2 will be limited by the slew rate control circuit 430. Moreover, since the multiplication of IVheat and Iheat becomes equal to Ipow, the output power Pheat of the fly height control system 400 is directly proportional to the input Power, independent of the resistance of the resistive heater element 490, i.e.:

$$Pheat = Vheat*Iheat = \frac{k_2}{k_1}*Ipow = \frac{k_0 k_2}{k_1}*DAC, \qquad \text{Eqn. (5)}$$

where Pheat is the output power of the fly height control system 400 at the output node N2. Furthermore, in one embodiment of the invention, the trim circuit 460 is applied to the voltage-to-current converter circuit 450 to further adjust the slope of output power, Pheat, as explained in further detail below.

In the embodiment of FIG. 4, the input current (IVheat_ref) and output current (IVheat_sr) of the slew rate control circuit 430 are both ratios of the output voltage, Vheat. In this regard, as compared to conventional architectures of fly height control systems that implement slew rate control based on a ratio of output power, it is more efficient and easier to control the slew rate of the output voltage, Vheat, even with a wider range of output voltages and a wider range of resistance values of the resistive heater element 490.

FIG. 5 is a schematic circuit diagram of fly height control circuitry 500 according to an embodiment of the invention. More specifically, FIG. 5 shows embodiments of a slew rate control circuit 530, a voltage-to-current converter circuit 550, and a trim circuit 560, which can be implemented in corresponding control blocks 430, 450 and 460 of the fly height control system 400 of FIG. 4, according to an embodiment of the invention. FIG. 5 further illustrates the PMOS output transistor 480 (with gate terminal connected to node N3) and the resistive heater element 490 connected to the output node N2. In the embodiment of FIG. 5, the circuitry for the error amplifier 440 (shown in FIG. 4) is integrated within the slew rate control circuit 530 and voltage-to-current converter circuit 550 of FIG. 5, wherein an output of the slew rate control circuit 530 and voltage-to-current converter circuit 550 are connected to node N3 (i.e., the gate terminal of the output transistor 480). For ease of illustration, FIG. 5 does not specifically show the PMOS output transistor 470 of FIG. 4, nor does FIG. 5 show embodiments of the digital-to-analog converter 410 and current multiplier circuit 420 of FIG. 4. The digital-to-analog converter 410 and current multiplier circuit 420 can be implemented using any known circuit architectures and frameworks that are suitable for the given application.

As shown in FIG. 5, the slew rate control circuit 530 comprises a first amplifier stage 532 and a second amplifier stage 534. The first amplifier stage 532 (or input stage) comprises a single-ended folded cascode amplifier framework comprising NMOS transistors Mn0, Mn00, Mn1, Mn01 Mn2, Mn02, Mn3, and Mn03, and PMOS transistors Mp0, Mp1, Mp2, Mp02, Mp3, Mp03, Mp4, and Mp5. The first amplifier stage 532 comprises an input resistor Ra, a current source 536 (which generates a reference current Isr), and an output capacitor Csr. The second amplifier stage 534 (or output stage) comprises an NMOS transistor Mn4 having gate terminal connected to the output capacitor Csr at an output node N11 of the first amplifier stage 532, and a resistor Rb connected to a source terminal of the NMOS transistor Mn4.

In the first amplifier stage 532, the PMOS transistors Mp0 and Mp1 are first and second input transistors of a folded cascode amplifier stage, and the NMOS transistors Mn02 and Mn03 are first and second folded cascode transistors of the folded cascode amplifier stage. A reference current, IVheat_ref, from a current multiplier circuit (e.g., the current multiplier circuit 420 of FIG. 4) is input to the slew rate control circuit 530, and the input reference current IVheat_ref flows through the input resistor Ra to generate a voltage on input node N10. The voltage on the input node N10 drives the gate terminal of the input transistor Mp0, which is a positive input of the first amplifier stage 532. The first amplifier stage 532 generates an output voltage on a single-ended output node N11, which drives the gate terminal of the NMOS transistor Mn4 at the input of the second amplifier stage 534. The second amplifier stage 534 generates an output voltage on node N12 which is fed back to a gate terminal of the second input transistor Mp1, which is a negative input of the first amplifier stage 532.

The diode-connected NMOS transistors Mn0 and Mn00 and NMOS transistors Mn1 and Mn01 comprise a cascode current mirror circuit. The reference current Isr, which is output from the current source 536, flows through diode-connected NMOS transistors Mn00 and Mn0 to generate a bias voltage on node N13 which drives the gate terminals of folded cascode transistors Mn02 and Mn03, and to generate a bias voltage on node N14 which drives the gate terminals of transistors Mn2 and Mn3. By operation of current mirroring, the reference current Isr (or a current proportional to Isr) is mirrored to flow through the NMOS transistors Mn01 and Mn1, as well as the diode-connected PMOS transistor Mp4. The current flowing through diode-connected PMOS transistor Mp4 is mirrored to the PMOS transistor Mp5, which serves as a tail transistor to generate a bias current for input transistors Mp0 and Mp0. The first and second input transistors Mp0 and Mp1 have drain terminals connected to nodes N15 and N16, respectively.

Due to the negative feedback loop, the voltage across resistor Ra (voltage on node N10) and the voltage across Rb (voltage on node N12) will be equal. As a result, the current through Rb, IVheat_sr, is determined as:

$$\text{IVheat\_sr} = \text{Vheat\_ref}*\frac{Ra}{Rb}. \qquad \text{Eqn. (6)}$$

When the mirror ratio between Mn0 to Mn1, Mn2 and Mn3 are determined, whenever there is a large differential input voltage at the gate terminals of the input transistors Mp0 and Mp1, a constant current in proportion to the bias current Isr will flow to the output capacitor Csr at the output node N11 of the first amplifier stage 532. By way of example, assume the current mirror ratios of Mn0 to Mn1, Mn2 and Mn3 are 1:1:2:2, and the current mirror ratio of and Mp5 to Mp4 is 1:1. The voltage on the gate terminal of the NMOS transistor Mn4 will show a constant slew rate of Isr/Csr. Consequently, by virtue of the architecture of the slew rate control circuit 530 shown in FIG. 5, an output current IVheat_sr of the slew rate control circuit 530 (i.e., the current flowing through Mn4 and Rb) is scalable by the factor Ra/Rb, and the slew rate of the output current can be well controlled. In this regards, the input current (IVheat_ref) and output current (IVheat_sr) of the slew rate control circuit 530 are both ratios of the output voltage, Vheat.

The voltage-to-current converter circuit 550 of FIG. 5 comprises PMOS transistors Mp6, Mp7 and Mp8, NMOS transistor Mn6, an amplifier 552 and resistors R0, R1, R2 and Rp. The amplifier 552 includes a non-inverting "+" input terminal connected to node N20 and an inverting "−" terminal connected to node N21. An output of the amplifier 552 drives a gate terminal of the NMOS transistor Mn6. An input node of the voltage-to-current converter circuit 550 is connected to the output node N2 to receive the output voltage Vheat that is applied to the resistive heater element 490. The output voltage Vheat on node N2 is scaled down by a resistor string comprising resistors R0, R1 and R2. In one embodiment, the resistors R0, R1 and R2 have a same resistance value, so that the voltage on node N20 is about ⅓ Vheat.

In one embodiment of the invention, the amplifier 552 comprises a single-ended folded cascode amplifier architecture which is the same or similar to the architecture of the first amplifier stage 532 of the slew rate control circuit 530, as discussed above. The NMOS transistor Mn6 and resistor Rp form a second amplifier stage in which the voltage at node N21 is fed back (negative feedback) to the inverting input of the amplifier 552. The amplifier 552 generates an output voltage based on a differential voltage applied at nodes N20 and N21 to drive the NMOS transistor Mn6. The NMOS transistor Mn6 outputs a current that is based on the output voltage of the amplifier 552. In this embodiment, the drain current of transistor Mp6 (denoted IMp6) is equal to $$\frac{Vheat}{3*Rp}.$$

The PMOS transistor Mp8 is utilized to compensate for output current loss due to the resistor string R0, R1 and R2. The PMOS transistor Mp7 mirrors the drain current, IMp6, of Mp6 to the output node N3. In other words, a drain terminal of the PMOS transistor Mp7 is an output node of the voltage-to-current circuit 550, which is fed back to the output of the slew rate control circuit 530 at node N3. In this regard, the PMOS transistor Mp7 outputs a current IVheat to node N3 which is proportional to the voltage Vheat.

In the embodiment of FIG. 5, an error amplifier 440 as shown in FIG. 4 is inherently integrated into the fly height control circuitry 500, where the error amplifier is actually constructed by the outputs of slew rate control circuit 530 and the voltage-to-current converter circuit 550. The outputs of the slew rate control circuit 530 and the voltage-to-current converter circuit 550 are commonly connected to the node N3 and to the gate terminal of the output NMOS transistor 480. The current IVheat output from the voltage-to-current converter circuit 550 flows into the node N3 and the current IVheat_sr of the slew rate control circuit 530 flows from the node N3. Since the output currents flow in opposite directions, the net current on node N3 is the difference of IVheat−IVheat_sr. Additionally, because the node N3 is a high impedance node, the voltage of the output node N3 is determined by the current difference (IVheat−IVheat_sr) times the impedance RN3, i.e., VN3=(IVheat−IVheat_sr)*RN3. Thus, the error amplifier 440 shown in FIG. 4 is inherently formed on the node N3, which simplifies the architecture of the fly height control circuitry 500.

The trim circuit 560 shown in FIG. 5 comprises PMOS transistor Mp9, diode-connected PMOS transistor Mp10, PMOS transistor Mp11, a plurality of switches S0, . . . , Sk, Sn, . . . , S11 and S12, a diode-connected NMOS transistor Mn5, and a plurality of parallel connected NMOS transistors Mn50, . . . , Mn5n. The plurality of switches S0, . . . , Sk, . . . , Sn are digitally controlled by respective bits b0, . . . , bk, . . . , bn, of a digital control signal. The switches S0, . . . , Sn are connected between node N30 and drain terminals of respective NMOS transistors Mn50, . . . Mn5n. The NMOS transistors Mn50, . . . Mn5n form a binary coded current digital-to-analog converter (current DAC) where a total current of the DAC is controlled by binary codes b0 to bn+1, where bn+1 is the sign bit. The switch S11 is switchably controlled by the sign bit bn+1 to switchably connect the output node N22 of the voltage-to-current converter circuit 550 to node N30 of the trim circuit 560. The switch S12 is controlled by control bit nbn+1 to switchably connect node N31 to node N30, where node N31 is the commonly connected drain and gate terminal node of the diode-connected PMOS transistor Mp10.

As the voltage-to-current converter circuit 550 converts the voltage Vheat to a current IVheat by operation of mirror devices Mp6 and Mp7, the trim circuit 560 utilizes the current mirror by applying a current loop on the master, diode-connected PMOS transistor Mp6 to generate a trim current, Itrim. The current loop comprises transistors Mp9, Mp10, Mp11, Mn5, and the string of parallel connected NMOS transistors Mn50, . . . , Mn5n. In the embodiment of FIG. 5, the sink/source current Itrim of the trim circuit 560 can be determined as:

$$Itrim = IMp6 * \frac{(b0 + 2b1 + 2^n bn)}{k}, \quad \text{Eqn. (7)}$$

where IMp6 is the drain current of PMOS transistor Mp6 in the voltage-to-current converter circuit 550, and where k is a drain current ratio between transistors Mp6 and Mn50. In one embodiment of the invention, the value of k is 100, so that the slope of Pheat (i.e., the power applied to Rheat at node N2) can be trimmed in a percentage-wise manner, in accordance with Eqn. (10) discussed below.

In addition, the polarity of the current Itrim is determined by controlling switches S11 and S12, which are controlled by the control bits bn+1 and nbn+1, respectively. The control bit nbn+1 is the inverse of the control bit bn+1. When the control bit bn+1 is logic high, the control bit nbn+1 is logic low, and vice versa. At any given time, only one of the switches S11 and S12 is activated (closed), which determines the polarity of Itrim. For example, when switch S11 is deactivated (open) and switch S12 is activated (closed), the current Itrim flows to a first supply node. On the other, when switch S11 is activated (closed) and switch S12 is deactivated (open), the current Itrim flows to a second supply node (e.g., ground in FIG. 5). When the current Itrim is applied to the drain of transistor Mp6, the current loop is closed and the current, IMp6, flowing from the drain of the PMOS transistor Mp6 is determined as:

$$IMp6 = \frac{Vheat}{3*Rp} + Itrim. \quad \text{Eqn. (8)}$$

When the trim circuit 560 is applied, the drain current IMp6 can be determined from Eqns. (7) and (8) as:

$$IVheat = \quad \text{Eqn. (9)}$$

$$IMp6 = \frac{Vheat}{3*Rp} * \left[1 + (-1)^{bn+1} * \frac{(b0 + 2b1 + \ldots + 2^b bn)}{k}\right]^{-1}.$$

Furthermore, since the drain current IVheat of PMOS transistor Mp7 is in proportion to the drain current of PMOS transistor Mp6 by virtue of current mirror operation, and since the output power Pheat of the fly height control circuit is Vheat*Iheat, the output power of the fly height control circuit of FIG. 5 can be determined as:

$$Pheat = Vheat * Iheat = \quad \text{Eqn. (10)}$$

$$\frac{k_0 k_2}{k_1} * DAC * \left[ 1 + (-1)^{bn+1} * \frac{(b0 + 2b1 + \ldots + 2^n bn)}{k} \right].$$

This equation, Eqn. (10), shows that the slope of the output power can be linearly adjusted by digital bits b0 to bn+1. The parameter k0 is a coefficient that is determined by the digital-to-analog control circuit 410 (as discussed above with referent to the fly height control circuit 400 of FIG. 4, for example). The parameter k1 is a coefficient that is determined by the current mirror ratio and resistance value of Rp in the voltage-to-current converter circuit 550. The parameter k2 is a coefficient that id determined by a ratio of Ra/Rb in the slew rate control circuit 530. Because the input/output currents to the trim circuit 560 are relatively small, the mirror devices MN5, Mn50~Mn5n can be designed with long channel lengths but short channel widths to save silicon size while maintain matching characteristics over variations in, e.g., temperature, voltage, and process conditions. In addition, because the trim circuit 560 is placed in the negative feedback loop of the voltage-to-current converter circuit 550, the trim circuit 560 does not affect the linearity and monotonicity of the fly height control circuit as determined by the digital-to-analog control circuit (e.g., circuit block 410 in FIG. 4). The trim circuit 560 has a compact circuit architecture (smaller footprint) and provides flexibility in changing the trim step size and the trim range. Indeed, high output accuracy is achieved using the trim circuit 560 of FIG. 5, which can adjust the output power slope in a linear manner with a precisely defined trim resolution/range. By way of specific example, in one embodiment of the invention, the trim circuit 560 can adjust the slope of the output power, Pheat, in a linear manner with a constant percentage-wise step size.

According to an embodiment of the fly height control circuitry 500 shown in FIG. 5, both the output power dissipated by the resistive heater element 490 and the slew rate of the output voltage on the resistive heater element 490 can be accurately controlled independent of the resistance value of the resistive heater element 490 over a wide range of operating voltages. In addition, due to the existence of the trim circuit, any variations in k0, k1, k2 introduced by process variations can be eliminated to provide even higher accuracy for current and future applications without any linearity and monotonic impacts to fly height circuit.

Figure 6:
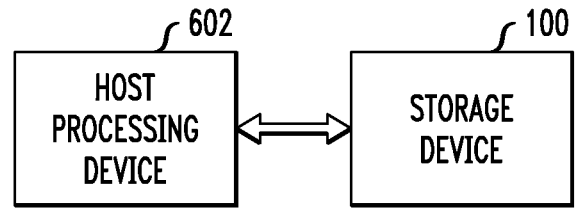
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
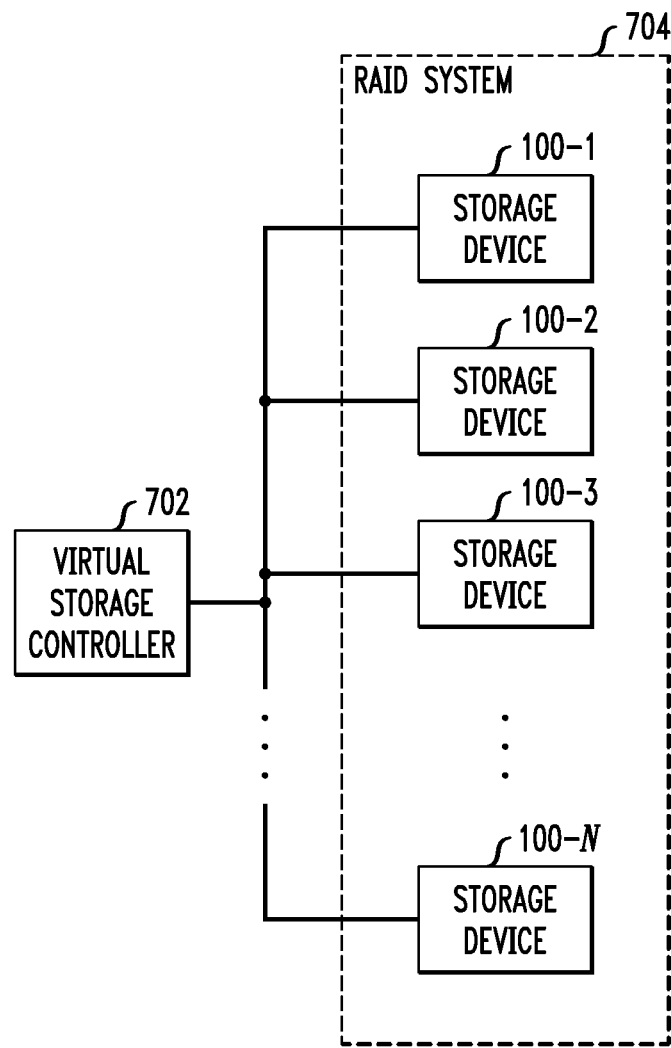
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . 100-N, one or more of which are assumed to be configured to include embodiments of fly height control systems and circuitry as described herein.

These and other virtual storage systems comprising hard disk drives or other disk-based storage devices of the type disclosed herein are considered embodiments of the invention. The host processing device 602 in FIG. 6 may also be an element of a virtual storage system, and may incorporate the virtual storage controller 702.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A fly height control circuit, comprising:
an input node to receive a digital control signal;
an output node to output a control current to a resistive heater element to adjust a spacing between a read/write head and a surface of a storage medium; and
control circuitry configured to process the digital control signal and generate the output control current based on the digital control signal,
wherein the control circuitry generates a first reference current based on a proportional current that is proportional to the output control current, and an input control current that is generated based on the digital control signal,
wherein the control circuitry controls a slew rate of the first reference current to generate a slew rate controlled reference current;
wherein the control circuitry generates a second reference current based on a feedback voltage at the output node; and
wherein the control circuitry compares the slew rate controlled reference current with the second reference current to adjust the output control current and thereby control a slew rate of an output voltage on the output node independent of a resistance value of the resistive heater element connected to the output node.

2. The fly height control circuit of claim 1, wherein the control circuitry generates the second reference current using trim control circuitry configured to adjust a slope of output power applied to the output node, wherein the slope of the output power is adjusted in a linear manner with a constant percentage-wise step size.

3. The fly height control circuit of claim 2, wherein the trim control circuitry comprises a binary coded digital-to-analog converter configured to generate a trim current having a magnitude specified by digital bits of a binary coded control signal.

4. The fly height control circuit of claim 1, wherein the slew rate controlled reference current is scalable by a ratio of a first resistor to a second resistor, wherein the first reference current flows through the first resistor and wherein the slew rate controlled reference current flows through the second resistor.

5. The fly height control circuit of claim 1, wherein the fly height control circuit comprises an integrated circuit that is implemented in a hard disk drive device.

6. The fly height control circuit of claim 5, wherein the fly height control circuit is implemented in a preamplifier circuit of the hard disk drive device.

7. A storage device, comprising:
a read/write head configured to read data from and write data to a storage medium, the read/write heat comprising a resistive heater element;

a fly height control circuit configured to control power applied to the resistive heater element to adjustably control a spacing between the read/write head and the storage medium, the fly height control circuit comprising:
an input node to receive a digital control signal;
an output node to output a control current to the resistive heater element connected to the output node; and
control circuitry configured to process the digital control signal and generate the output control current based on the digital control signal,
wherein the control circuitry generates a first reference current based on a proportional current that is proportional to the output control current, and an input control current that is generated based on the digital control signal,
wherein the control circuitry controls a slew rate of the first reference current to generate a slew rate controlled reference current;
wherein the control circuitry generates a second reference current based on a feedback voltage at the output node; and
wherein the control circuitry compares the slew rate controlled reference current with the second reference current to adjust the output control current and thereby control a slew rate of an output voltage on the output node independent of a resistance value of the resistive heater element connected to the output node.

8. The storage device of claim 7, wherein the control circuitry generates the second reference current using trimming control circuitry configured to adjust a slope of output power applied to the output node, wherein the slope of the output power is adjusted in a linear manner with a constant percentage-wise step size.

9. The storage device of claim 8, wherein the trimming control circuitry comprises a binary coded digital-to-analog converter configured to generate a trim current having a magnitude specified by digital bits of a binary coded control signal.

10. The storage device of claim 7, wherein the slew rate controlled reference current is scalable by a ratio of a first resistor to a second resistor, wherein the first reference current flows through the first resistor and wherein the slew rate controlled reference current flows through the second resistor.

11. The storage device of claim 7, wherein the storage device comprises a hard disk drive device.

12. A virtual storage system comprising the storage device of claim 7.

13. A method for controlling a spacing between a read/write head and a storage medium, comprising the steps of:
receiving a digital control signal;
processing the digital control signal to generate an output control current based on the digital control signal; and
outputting the output control current to a resistive heater element to adjust a spacing between a read/write head and a storage medium;
wherein processing the digital control signal comprises:
generating a first reference current based on a proportional current that is proportional to the output control current, and an input control current that is generated based on the digital control signal,
controlling a slew rate of the first reference current to generate a slew rate controlled reference current;
generating a second reference current based on a feedback voltage generated as a result of output control current flowing through the resistive heat element; and comparing the slew rate controlled reference current with the second reference current to adjust the output control current and thereby control a slew rate of an output voltage on an output node independent of a resistance value of the resistive heater element connected to the output node.

14. A fly height control system, comprising:
an input node to receive a digital control signal;
an output node to output a control current to a resistive heater element to adjust a spacing between a read/write head and a surface of a storage medium; and
control circuitry configured to process the digital control signal and generate the output control current based on the digital control signal, wherein the control circuitry comprises:
a digital-to-analog converter circuit configured to process the input digital control signal and generate a first analog current based on the input digital control signal;
a current multiplier circuit configured to multiply the first analog current by a second analog current to generate a first reference current;
a slew rate control circuit configured to control a slew rate of the first reference current to generate a slew rate controlled reference current;
a voltage-to-current converter circuit configured to generate a second reference current that is proportional to a feedback voltage on the output node;
a current difference amplifier configured to compare the slew rate controlled reference current with the second reference current and generate a control voltage;
a first transistor and a second transistor having gate terminals connected to an output of the current difference amplifier, wherein the first and second transistors are driven by the control voltage output from the current difference amplifier,
wherein in response to the control voltage, the first transistor generates the second analog current that is input to the current multiplier circuit,
wherein in response to the control voltage, the second transistor generates the output control current that is output to the resistive heater element to thereby control a slew rate of an output voltage on the output node independent of a resistance value of the resistive heater element connected to the output node.

15. The fly height control system of claim 14, wherein the control circuitry further comprises a trim control circuit which is connected to the voltage-to-current converter circuit and which is configured to controllably adjust the second reference current output from the voltage-to-current converter circuit to adjust a slope of output power applied to the output node, wherein the slope of the output power is adjusted in a linear manner with constant percentage-wise step size.

16. The fly height control system of claim 15, wherein the trim control circuit comprises a binary coded digital-to-analog converter configured to generate a trim current having a magnitude specified by digital bits of a binary coded control signal.

17. The fly height control system of claim 15, wherein the slew rate control circuit comprises a first amplifier stage and a second amplifier stage, wherein the first amplifier stage amplifies receives as input a first voltage generated by the first reference current flowing through a first resistor, and a second feedback voltage from the second amplifier stage which is generated by the slew rate controlled reference voltage flowing through a second resistor.

18. The fly height control system of claim 17, wherein the slew rate controlled reference current is scalable by a ratio of the first resistor to the second resistor.

19. The fly height control system of claim 14, wherein an output of the slew rate control circuit is commonly connected to an output of the voltage-to-current converter circuit, and wherein the commonly connected outputs are directly connected to gate terminals of the first and second transistors, wherein the current difference amplifier is integrated in the circuitry of the slew rate control circuit and the voltage-to-current converter circuit.

20. A hard disk device comprising the fly height control system of claim 14.

* * * * *